Figure 1:
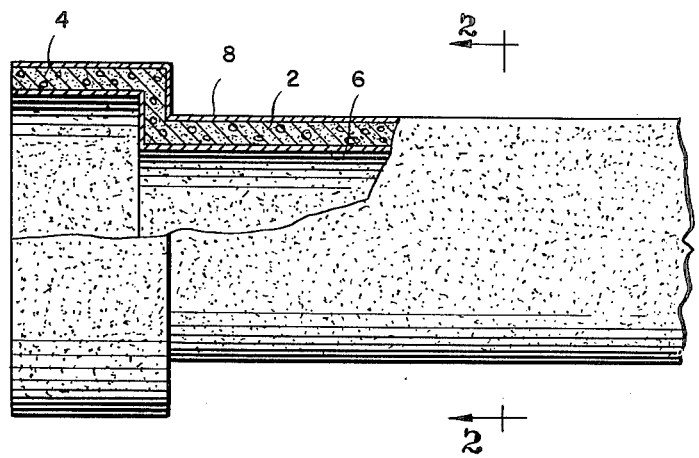

Nov. 29, 1960   J. A. SERGOVIC   2,962,052
PIPE AND METHOD OF MAKING SAME
Filed May 9, 1956

INVENTOR
JOHN A. SERGOVIC

BY *Cushman, Darby & Cushman*
ATTORNEYS

United States Patent Office 2,962,052
Patented Nov. 29, 1960

2,962,052

PIPE AND METHOD OF MAKING SAME

John A. Sergovic, Baltimore, Md., assignor to The Burns & Russell Company of Baltimore City, a corporation of Maryland Filed May 9, 1956, Ser. No. 583,879

9 Claims. (Cl. 138—68)

This invention relates to the coating of concrete pipe.

It is an object of the present invention to increase the wear resistance of concrete pipe.

A further object is to increase the chemical resistance of concrete pipe.

Yet another object is to provide concrete pipe with a smooth surface having low frictional loss as well as low cleavage.

It has been found that these and other objects of the invention which will be apparent as the descritpion proceeds can be attained by coating concrete pipe with a composition comprising an ethylenically unsaturated alkyd resin and a polymerizable vinyl monomer together with sand as a filler.

It is important to use sand as satisfactory results are not obtained when other fillers, such as calcium carbonate for example, are used to replace the sand.

In the following specification and claims all parts and percentages are by weight unless otherwise indicated.

For convenience the mixture of an ethylenically unsaturated alkyd resin and polymerizable vinyl monomer will hereinafter alternatively be called a polyester resin.

The coating composition of the polyester resin and sand should contain 50–90% of sand and 10–50% of resin. Preferably, the sand and resin are used in a ratio of 3.8 parts of sand to one part of resin.

The concrete pipe employed is of the conventional type and can be either reinforced or unreinforced. When reinforced pipe is employed, the reinforcing agent is a steel mesh, as is understood in the art. The concrete can be a 1:2.5:5 mix (cement to sand to aggregate), although any conventional concrete that is used to make concrete pipe can also be used. The present invention is applicable to all standard sizes of concrete pipe, e.g., from 4 inches to 12½ feet inside diameter and lengths up to 16 feet or longer.

The pipe can be coated either on the outside or on the inside or both. The advantages obtained by coating the pipe on the inside are that there is a marked increase in the wear resistance of the pipe, and the very smooth surfaces formed result in low frictional loss and also result in low cleavage, i.e., there is prevented the adherence to the pipe of salts and other materials which come out of the liquids which are transmitted through the pipe. Additionally, the polyester and sand coating imparts high chemical resistance to the inside surface of the pipe.

The primary purpose of applying an outside coating of the resin-sand coating composition is to impart high chemical resistance. Without such a coating the concrete pipe is completely unsuitable, for example, to be buried in soils of high acid content. Where there is no problem of chemical attack, however, the outside coating of polyester resin-sand can be omitted. Similarly, where the only problem is attack of the external environment of the pipe, then the internal polyester resin-sand coating can be omitted.

The polyester resin-sand coating can be applied externally by means of a spray gun or paint brush or by trowelling. An internal coating can be applied by the same methods or by extruding the resin-sand composition on the internal surface of the pipe while at the same time imparting a rotation to the pipe. In this latter case, the rotation speed is slow until the resin-sand composition has been inserted and then the speed is increased to uniformly spread the resin-sand coating.

Figure 2:
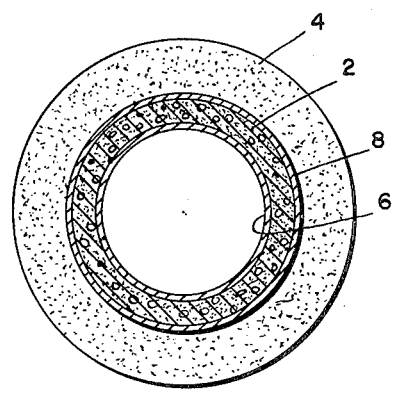

In the drawings:

Figure 1 is a vertical section of a concrete pipe having both an internal and an external coating of the polyester resin-sand composition; and Figure 2 is a section along the line 2—2 of Figure 1.

Referring more specifically to the drawings, there is shown a concrete pipe 2 having a conventional flange 4 at one end. The pipe throughout its length has an internal coating 6 of polyester resin-sand an an external coating 8 of the same polyester resin-sand composition.

The polyester resin-sand composition normally is applied internally to a thickness of $\frac{1}{16}$ to $\frac{1}{4}$ inch, and externally to the same thickness. Larger thicknesses can be imparted although they are not normally necessary and have the disadvantage of unduly increasing the cost of the finished product.

The polyester resins are a class of resins with which the resin chemist is familiar. The preferred resins of this class for employment in the coating compositions of the invention are the polymeric ester reaction products of one or more dicarboxylic acids and one or more polyhydric alcohols. Desirably one or more of these reactants shall contain a reactive double bond or ethylenic linkage. Among the dicarboxylic acids which may be used are phthalic, malic, maleic, fumaric, adipic, pimelic, suberic, sebacic, itaconic, citraconic, and succinic acids and their anhydrides. It is essential that some of the dicarboxylic acid component of the polyester resin contain an unsaturated ethylenic linkage. For this reason, maleic and fumaric acids are most desirable. Among the polyhydric alcohols which may be used are ethylene glycol, diethylene glycol and propylene glycol. A mixture of propylene glycol and dipropylene glycol is the most satisfactory polyhydric alcohol. One may use an unsaturated monohydric alcohol in place of part of the polyhydric alcohol. A typical example of such an alcohol is allyl alcohol which produces an allyl ester of the dicarboxylic acid. The polyester resins may be suitably modified or plasticized by the incorporation of alcohols, fatty acids, etc., to modify the chemical and physical characteristics as desired. The polyesters should comprise upward from about 15 or 30% and preferably 50% to 85% by weight of the resin and resin forming component, e.g., styrene, of the coating composition.

The resin component of the coating composition should also contain a non-volatile, monomeric, cross-linking solvent for the polyester resin. The function of this solvent is to make the polyester resin more fluid and also to cross-link the polyester resin at the time of curing to produce a cross-linked, or three dimensional resin with the polyester resin which is thermosetting in character. This monomeric solvent is an important member of the resin component, for it provides the necessary fluidity to the resin component, imparts thermosetting characteristics to the cured resin and is consumed during the curing of the resin without forming volatile materials. This freedom from volatility is highly important for otherwise the release of volatile matter would produce bubbles, voids or pinholes on the surface and throughout the finished coating of the pipe. The lack of volatile matter permits curing when under pressure without requiring provision for vents, etc., in the molds.

Also, escaping combustible, volatile matter may produce explosions, or fire hazards.

Among the monomeric polymerizable solvents which may be used are the hydrocarbons: styrene, vinyl toluene, e.g., o-vinyl toluene, p-vinyl toluene, and m-vinyl toluene, cyclo-pentadiene; vinyl acetate; diallyl esters, e.g., diallyl phthalate and triallyl cyanurate, as well as alpha methyl styrene. Styrene has produced the most satisfactory results thus far.

When produced commerically, these resin compositions also contain a small amount of a polymerization inhibitor so as to prevent gelation during storage prior to usage. Such inhibitors include the well known antioxidants; hydroquinone, t-butyl catechol, quinone, etc.

Polyester resins of the character contemplated for use in the present invention are sold in the trade and identified as "Paraplex" or "Vibrin" resins. In general, these resins are unsaturated high molecular weight polymers made by reacting one or more acids or a blend of acids, such as maleic or fumaric acid, with a dihydroxy alcohol, such as ethylene glycol. The specific properties of these resins vary depending largely upon the type and amount of each constituent in the combination. For best results, I prefer to employ a mixture of two different types of such resins. Certain of these resins form masses upon curing that are very rigid or inflexible, while others form more flexible rubbery masses. For the coating composition of my invention, I prefer to use a mixture of the rigid and flexible resins, and have found that with resins commercially available about 2 to 5 parts of rigid resin and 1 part of flexible resin produce excellent results. These proportions may, of course, be varied within wide limits depending upon the particular properties desired for the cured coating layer and the properties of the resins that are mixed.

I mix the resin and monomeric polymerizable solvent, such as styrene or other ethylenically unsaturated monomer, e.g., vinyl acetate or vinyl toluene, with the finely divided sand filler to form a coating composition having the consistency of a thick slurry. The monomer is used in an amount of 15–85% or occasionally slightly more of the total of resin solids and monomer. Preferably, the monomer is employed in an amount of 50–85% of this resin solids-monomer liquid mix. About 40% resin solids and 60% styrene has been found to give a good workable consistency when employed with the sand, especially when the ratio of sand to polyester resin is about 3.8 to 1. The sand filler is finely divided silica which can be obtained from any source as silica. While sand is the preferred filler because of its chemical inertness and hardness, it is also possible to use other finely divided acid-resistant crushed rock as fillers, e.g., gravel.

The sand increases the hardness and strength of the coated surface. While it is possible to employ irregularly shaped particles of sand, it is preferable to use rounded particles of the sand filler.

While the sand can be of uniform particle size, e.g., between 30 and 200 mesh (U.S. Standard Sieve Series), it is preferable to employ sand having a gradation of particle size. When there is a gradation of particle size of the sand filler, there preferably is a gradual diminution in the quantity of material (by weight) corresponding to each sieve size as one goes from larger to smaller Standard Sieve sizes.

In practice, satisfactory results may be obtained by using particles having at least two general particle size classifications, one of which may be said to be of large size (in the order of 30–70 mesh) and another of small size (in the order of 100–325 mesh). It has been found desirable to employ a major proportion, and preferably 60% or more, by weight, of the large size particles. One particularly successful gradation has been one in which about 65% by weight of the filler is of sand of approximately 40–70 mesh and 35% is of 70–140 mesh size. I have found also that a gradation of 80% of the former mesh size and 20% of the latter is equally satisfactory.

In addition to using a gradation of particle size of filler material, I prefer to use some filler of extremely small particle size, in the order of 325-mesh or smaller. Such material is sold under the designation "silica flour" or "Surfex." I prefer to add this material to the liquid resin component of the coating composition.

If desired, it is possible to add pigments and dyes for decorative purposes, but normally there is no need to utilize such materials. Either just prior to or just subsequent to mixing the polyester resin with the filler, a suitable polymerization catalyst should be added. The mixture of polyester resin, sand and catalyst is then applied to the pipe in one of the manners previously set forth. The resin is cured on the pipe at a temperature from room temperature up to about 350° F. To obtain a quick cure, temperatures in the upper range, e.g., 325–350° F., are preferable. Where time is not of the essence, lower temperatures can be satisfactorily employed.

As the catalysts there can be utilized numerous oxidizing catalysts, such as cumene hydroperoxide, dicumyl peroxide, benzoyl peroxide, and methyl ethyl ketone peroxide. The catalyst is usually employed in an amount of 0.5–4% of the polyester resin. Preferably, there is utilized with the catalyst a metallic drier such as manganese or cobalt naphthenate, for example. A typical example of a satisfactory catalyst-drier combination is 2% benzoyl peroxide, .75% manganese naphthenate and .75% cobalt naphthenate based on the polyester resin when using a cure in the upper end of the temperature range previously set forth.

On occasion it has been found advantageous to incorporate into the coating slurry a small percent, e.g. 1½–2% by weight of the total slurry of a cation modified clay, such as those disclosed in Hauser Patent 2,531,427. A preferred material of this class is dimethyldioctadecylammonium bentonite which is sold under the name "Bentone 34."

Typical examples of polyester resin-sand compositions which may be employed in forming the inside or the outside coating on the pipe are given below.

*Example 1*

A coating composition was prepared by stirring in a mixing vessel just prior to the coating operation an initial mixture having the following composition:

A mixture of about 27% by weight of polyester resins made up of 3 parts of rigid type polyester resin (Paraplex P43, believed to be a condensation product of propylene glycol and dipropylene glycol in the ratio of 1 to 3 with phthalic anhydride and maleic anhydride in ratio of 3 to 2) and 1 part of flexible type polyester resin (Paraplex P13, believed to be a condensation product of ethylene glycol and diethylene glycol with phthalic anhydride, maleic anhydride and adipic acid), 23% by weight of styrene monomer, 5% by weight of titanium dioxide as a pigment, and about 45% by weight of #325-mesh asbestine_____lbs__ 25.5

To this initial mixture were added the following:

Styrene monomer (solvent)_____lbs__ 6.5
Bentone 34 (dimethyldioctadecylammonium bentonite) _____lbs__ 0.5
Methyl ethyl ketone peroxide (catalyst)_____cc__ 250
Manganese naphthenate (catalyst)_____lbs__ 0.4

The resulting mix was agitated and to it was added promptly the following fillers:

86 lbs. crystal silica sand having the following approximate sieve analysis—

| Sieve sizes: | Approx. percentages |
|---|---|
| No. 40 | 38.0 |
| No. 50 | 41.0 |
| No. 70 | 14.0 |
| No. 100 | 4.0 |

22 lbs. banding sand having the following approximate sieve analysis—

| Sieve sizes: | Approx. percentages |
|---|---|
| No. 50 | 0.9 |
| No. 70 | 20.0 |
| No. 100 | 48.2 |
| No. 140 | 20.9 |
| No. 200 | 7.0 |
| No. 270 | 2.5 |

*Example 2*

| | Parts by weight |
|---|---|
| Rigid type polyester resin (Paraplex P43) | 45 |
| Flexible type polyester resin (Paraplex P13) | 15 |
| Methyl ethyl ketone peroxide (catalyst) | 2 |
| Manganese naphthenate (catalyst) | 2 |
| Titanium dioxide (pigment) | 12 |
| Resin coated calcium carbonate (Surfex, believed to be calcium carbonate coated with polydimethyl siloxane resin) (filler) | 19 |
| Bentone 34 (dimethyldioctadecylammonium bentonite | 2 |
| Monomeric styrene (solvent) | 3 |
| Total | 100 |

To this mixture was added about 2 parts of silica sand to 1 part of the mixture. This silica sand was composed of about 65% by weight of particles of about 40 to 50 sieve size and 35% of about 100 sieve size.

*Example 3*

A solid polyester resin was prepared from 1266 pounds phthalic anhydride, 636 pounds maleic anhydride, 501 pounds dipropylene glycol and 855 pounds of propylene glycol. This resin which possessed an acid number of 35, was admixed with 1.32 pounds of hydroquinone as an inhibitor. This mixture of resin and inhibitor was diluted with 1284 pounds of styrene.

To 52 pounds of this resin, inhibitor and styrene mixture, there were added 1.5 pounds of benzoyl peroxide and 1.5 pounds of methyl ethyl ketone peroxide as well as 1.5 pounds of manganese naphthenate, 0.5 pound of cobalt naphthenate, 4.5 pounds of titanium dioxide (pigment), 1.5 pounds of Bentone 34, 5 pounds of antimony trioxide, 10 pounds of solid chlorinated paraffin and 18 pounds of styrene.

To one pound of the above composition, there is added 3.8 pounds of graded silica sand (of the same composition as in Example 1).

*Example 4*

The coating composition prepared in Example 1 was applied to the interior of the reinforced concrete pipe of 6 feet internal diameter by employing a spray gun. The coating was smoothed out by applying a sheet of cellophane over the coating and allowing the cellophane to remain until the coating composition had cured at room temperature. This took about 24 hours. The cellophane was then removed and the resulting coating on the interior of the pipe had a smooth surface. The same procedure was employed to coat the exterior of the pipe with the composition of Example 1 and in similar fashion the coating was made smooth by the use of a cellophane covering which was subsequently removed after the resin had cured.

The finished product after removal of the cellophane is illustrated in Figure 1.

*Example 5*

A reinforced concrete pipe of 12 feet internal diameter and 2 feet in length was placed on rollers which were suitably connected to a variable speed motor. The resin-sand composition prepared in Example 3 was introduced to the interior of the pipe through a flexible hose. The hose was attached to a piston which was actuated by a cylinder containing compressed air. The piston was of sufficient length that the hose could travel from one end of the pipe to the other. The variable speed motor was started so that the pipe rotated at a speed of about ⅓ of a revolution per minute, and the resin was allowed to drip into the pipe through the hose. Simultaneously, the piston was actuated so that the resin composition was supplied throughout the length of the pipe. After three minutes, the resin had been supplied to the entire pipe and the piston and hose were removed from the interior of the pipe. The variable speed motor was then adjusted so that the pipe rotated at about 80 r.p.m. and this speed of rotation was continued for about three minutes in order to make the coating uniform throughout the pipe. The motor was then shut off.

Next, there were inserted into the pipe 2 split hemispherical steel molds which were kept apart by a jack. These molds were covered with cellophane as a parting agent and the jack was raised so that the cellophane coating on the split mold contacted the coating composition. The coating composition was then allowed to cure for about 24 hours at room temperature and the jack released so that the mold could be removed. The resulting coating on the interior of the pipe was smooth. In this example the split mold could be made of wood, metal or other material, and the parting agent could be a polytetrafluoroethylene coating or a silicon, e.g., a polymeric dimethylsiloxane coating.

*Example 6*

Example 5 was repeated but the curing time was reduced to 30 minutes by placing the entire assembly of pipe and split molds in an oven heated to 325° F.

*Example 7*

An unreinforced concrete pipe of 6 inch internal diameter and 3 feet in length was coated on the outside with the composition of Example 2 by the brush method. A cellophane film was applied over the coating to smooth out the same and the pipe was then placed in an oven at 350° F. for 30 minutes in order to cure the resin. After removal from the oven, the cellophane film was taken off. The resulting pipe had a smooth, hard coating of the polyester resin-sand composition.

I claim:

1. A concrete pipe having a facing layer of the reaction product of an ethylenically unsaturated alkyd resin and a polymerizable vinyl monomer and a filler from the group consisting of sand and finely divided acid-resistant rock, the filler being in an amount of between about 50 and 90% of the total of the resin, monomer and filler by weight, the facing layer having a hard, abrasion-resistant surface and providing a chemical-resistant coating to the pipe.

2. A concrete pipe having a facing layer of the reaction product of an ethylenically unsaturated alkyd resin and a polymerizable vinyl monomer and sand as a filler, the sand being in an amount of between about 50 and 90% of the total of resin, monomer and filler by weight, the facing layer having a hard, abrasion-resistant surface and providing a chemical-resistant coating to the pipe.

3. A concrete pipe according to claim 2 wherein the facing layer is applied to the interior surface of the pipe.

4. A concrete pipe according to claim 2 wherein the facing layer is applied to the exterior surface of the pipe.

5. A concrete pipe according to claim 2 having an interior facing layer of the resin-filler composition and also an exterior facing layer of the resin-filler composition.

6. A concrete pipe according to claim 2 wherein the alkyd resin comprises a saturated glycol and an ethylenically unsaturated dicarboxylic acid.

7. A concrete pipe according to claim 6 wherein the vinyl monomer is styrene.

8. A concrete pipe according to claim 7 wherein the ratio of sand to resin components is about 3.8 to 1.

9. A method of treating a hollow concrete pipe to impart a hard, abrasion-resistant and chemical-resistant coating thereto comprising applying to the surface of the pipe a mixture of an ethylenically unsaturated alkyd resin, a vinyl monomer and a filler from the group consisting of sand and finely divided acid-resistant rock, the filler being used in an amount of between about 50 and 90% of the total of the resin, monomer and filler by weight and thereafter curing the resin to form a facing layer on the pipe.

References Cited in the file of this patent

UNITED STATES PATENTS

| | | |
|---|---|---|
| 2,160,372 | Stark | May 30, 1939 |
| 2,409,633 | Kropa | Oct. 22, 1946 |
| 2,445,764 | D'Alelio | July 27, 1948 |
| 2,623,030 | Cordier | Dec. 23, 1952 |
| 2,641,586 | Norlander | June 9, 1953 |
| 2,656,857 | Cavilier | Oct. 27, 1953 |
| 2,667,465 | Nebesar | Jan. 26, 1954 |
| 2,679,493 | Anderson | May 25, 1954 |

FOREIGN PATENTS

| | | |
|---|---|---|
| 521,902 | Great Britain | June 4, 1940 |